United States Patent [19]

Cingone

[11] Patent Number: 4,656,754

[45] Date of Patent: Apr. 14, 1987

[54] LENS PATTERN BLANK

[75] Inventor: James Cingone, Hempstead, N.Y.

[73] Assignee: James Industries Inc., Hempstead, N.Y.

[21] Appl. No.: 798,037

[22] Filed: Nov. 14, 1985

[51] Int. Cl.$^4$ ............................................. A61B 3/10
[52] U.S. Cl. ........................................ 33/507; 33/200
[58] Field of Search ................................ 33/507, 200

[56] References Cited

U.S. PATENT DOCUMENTS

| | | | |
|---|---|---|---|
| 1,520,445 | 12/1924 | Rushmer | 33/507 |
| 1,648,500 | 11/1927 | Newell et al. | 33/507 |
| 1,790,572 | 1/1931 | Bugbee | 33/507 |
| 2,413,198 | 12/1946 | Stewart | 33/507 |
| 3,313,031 | 4/1967 | Lowe | 33/507 |
| 4,244,639 | 1/1981 | Kanda | 33/200 |
| 4,299,032 | 11/1981 | Young | 33/507 |

Primary Examiner—Willis Little
Attorney, Agent, or Firm—Sprung Horn Kramer & Woods

[57] ABSTRACT

A lens pattern blank has a pattern of concentric circles on one face with the centers of the circle coincident with the center of the mounting hole in the mounting hub thereof and diameter indicators for each circle disposed on the face and within each circle. The blank also includes a protractor pattern on one face having the center point thereof coincident with the center of the central mounting hole and angle indicators on the face for the protractor pattern angles.

11 Claims, 6 Drawing Figures

LENS PATTERN BLANK

BACKGROUND OF THE INVENTION

The present invention relates to a lens pattern blank for use in shaping lenses for fitting into eyeglass frames and the like.

Lens pattern blanks are known in the art and are typified by the prior art blank 1 shown in FIGS. 1 and 2. Blanks of this type, although shown in one particular shape, can be square, rectangular or circular. These blanks are generally formed from high impact styrene plastic and have two planar faces 2, 3 and a mounting hub 4 including mounting holes 5-7 which are used to mount the blank on a lens cutting or edging machine.

Conventional blanks include a centering grid pattern thereon including X and Y axes 8, 9 which have as their origin the center C of mounting hole 5. The X and Y axes 8, 9 also include distance indicia 10 thereon to enable the blank to be centered in the lens opening of a frame. This blank is used by the optician or optical lab technician to cut a pattern for a particular frame to be able to cut a round lens to the proper shape to be fit into the frame.

When a pattern is cut manually or mechanically, the most important data that must be supplied to the optician or lab technician is the effective diameter of the pattern which is twice the largest radius from the geometric center and the angle of that radius. This enables the optician to choose a smaller and therefore less expensive lens blank for the prescription.

Conventionally, the length of the longest radius has been obtained by making measurements on the pattern after it has been cut. The grid on the face of the blank is used to center the eyeglass frame over the lens blank when the pattern is being drawn thereon.

SUMMARY OF THE INVENTION

The object of the present invention is to simplify the obtaining of the effective diameter and angle data.

These and other objects of the present invention are achieved in accordance with the present invention by providing a pattern of concentric circles on one face of the pattern blank, preferably opposite that of the grid, with the centers of the concentric circles being coincident with the center C of the mounting hole. The diameter indicators for each circle are disposed on the face with the circles and at the circumference thereof, and preferably within each circle. Preferably, four diameter indicators are provided for each circle and are disposed along radii extending at angles from 30°-40°, 120°-130°, 210°-220°, 300°-310° with respect to the X axis 8 of the grid pattern on the other face. The angles are preferably 35°, 125°, 215°, and 305°.

The angle data is preferably obtained by providing a protractor pattern on one face of the blank preferably the one having the grid, with the center point of the protractor being coincident with the center C of the mounting hole. The protractor pattern includes angle indicators on the face for indicating the protractor pattern angles.

These and other features and advantages of the present invention will become more apparent from a detailed description of the invention taken with the attached drawings, wherein:

DETAILED DESCRIPTION OF THE INVENTION

Figure 1:
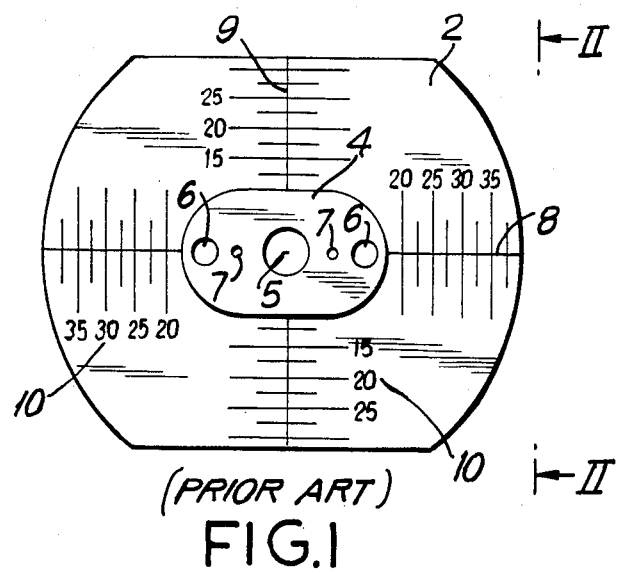
FIG. 1 is a front view of a prior art blank.
Figure 2:
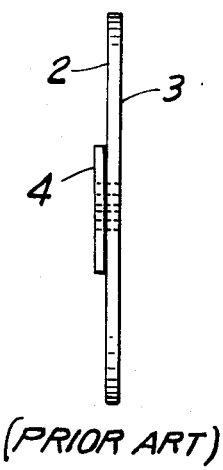
FIG. 2 is a side view of FIG. 1.
Figure 3:
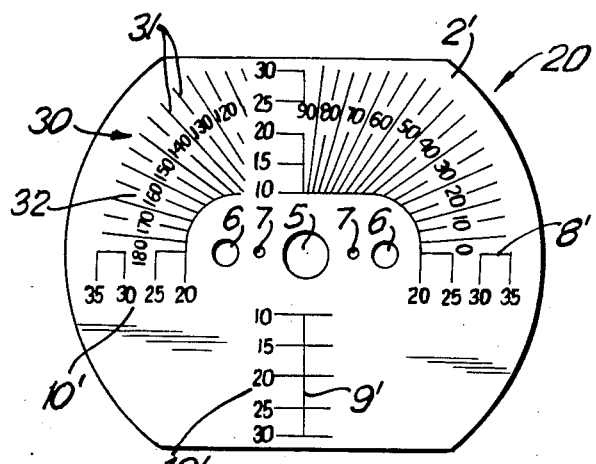
FIG. 3 is a front view of a blank in accordance with the present invention.
Figure 4:
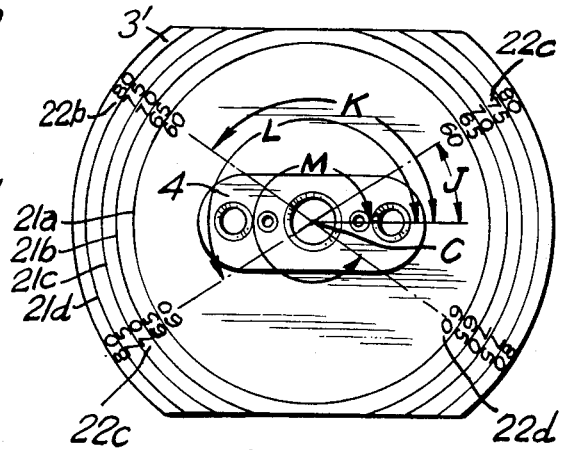
FIG. 4 is a front view of the rear of the blank of FIG. 3.

The lens pattern blank 20, as shown in FIGS. 3-4, has a front face 2' and a rear face 3' at which the mounting hub 4 is disposed. The mounting hub 4 also includes the holes 5-7 and the hole 5 having the center point C. Face 2' includes the centering X-Y grid 8', 9' and indicia 10' thereon.

FIG. 3 shows the protractor pattern 30 on face 2' which includes a plurality of angle lines 31 and angle indicia 32 which runs from 0° to 180°.

On face 3' are provided a plurality of concentric circles 21a-21d each of which has the common center C. Associated with circles 21a-21d are four sets of diameter indicia 22a-22d which are disposed at substantially equal angular intervals. The indicia are provided within each circle for reasons that will become evident hereinafter. The indicia 22a-22d are also preferably provided so that indicia 22a is at an angle of J of 30°-40° preferably 35°, indicia 22b is at an angle K of 120°-130°, preferably 125°, indicia 22c is at an angle L of 210°-220°, preferably 215° and indicia 22d at an angle M of 300°-310°, preferably 305°.

Figure 6:
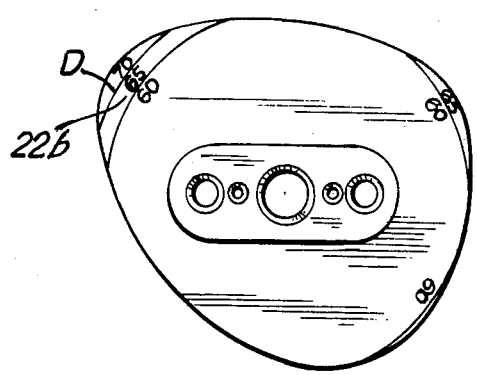
FIG. 6 shows the blank of FIG. 4 after it has been cut.

The reason for this is that most long points occur in the 30°-40° range and thus when the lens pattern blank is cut as shown in FIG. 6, the diameter indicia will almost be evident for the longest radii.

Figure 5:
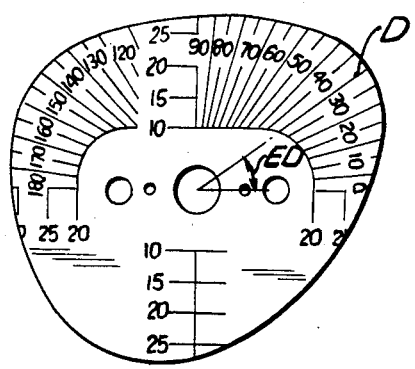
FIG. 5 shows the blank of FIG. 3 after it has been cut.

As can be seen from FIGS. 5 and 6, after the pattern blank is cut, the angle ED of the longest radii is immediately apparent from the protractor pattern 30 on face 2' and the effective diameter D for a lens blank to be used will become immediately apparent from indicia 22b wherein the highest number 70 indicates that the lens blank that must be used to produce the lens has to have a diameter of 70 mm. Because the diameter indicia is placed within the circle, the highest remaining number left on face 3' after the lens pattern blank has been cut, will immediately indicate the effective diameter of the lens that must be used for the particular frame.

It is apparent to one skilled in the art that the concentric circles and the protractor pattern can be placed on either of the two faces in any combination independent of the placement of the mounting hub. It is also apparent that while four sets of diameter indicia have been used, more or less can be used in the scope of the present invention.

It is also apparent that the present invention will work equally well with other shape pattern blanks including square, rectangular and circular blanks. It can be seen that the outermost concentric circle in FIG. 4 can be the outer periphery of the lens blank itself when the pattern has a circular periphery.

It will be appreciated that the instant specification and claims are set forth by way of illustration and not limitation, and that various modifications and changes may be made without departing from the spirit and scope of the present invention.

What is claimed is:

1. In a lens pattern blank having two planar faces, a mounting hub on one face, a circular mounting hole passing through the faces and the hub and a grid pattern on one of the two faces and having the origin of the axes thereof coincident with the center of the mounting hole, the improvement comprising: a pattern of concentric circles on one of the two faces and having the centers thereof coincident with the center of the mounting hole and diameter indicators for each circle disposed on the same face as the circles and at the circumference of each circle.

2. The lens pattern blank according to claim 1, comprising four diameter indicators for each circle and disposed along radii extending at angles 30°–40°, 120°–130°, 210°–220°, 300°–310° with respect to one axis of the grid pattern on the first face.

3. The lens pattern blank according to claim 2, wherein the radii extend at angles of 35°, 125°, 215° and 305°.

4. The lens pattern blank according to claim 1, further comprising a protractor pattern on one face and having the center point there coincident with the center of the mounting hole and angle indicators on the same face for the protractor pattern angles.

5. The lens pattern blank according to claim 1, wherein the diameter indicators for each circle are disposed within each corresponding circle.

6. The lens pattern blank according to claim 1, wherein the pattern of circles and the grid pattern are disposed on opposite faces.

7. In a lens pattern blank having two planar faces, a mounting hub on one face, a circular mounting hole passing through the faces and the hub and a grid pattern on one of the two faces and having the origin of the axes thereof coincident with the center of the mounting hole, the improvement comprising: a protractor pattern on one of the two faces and having the center points thereof coincident with the center of the mounting hole and angle indicators on the same face as the protractor pattern for the protractor angles.

8. The lens pattern blank according to claim 7, further comprising a pattern of concentric circles on the other of the two faces and having the centers thereof coincident with the center of the mounting hole and four diameter indicators for each circle on said other face and positioned at equal angular intervals.

9. The lens pattern blank according to claim 8, wherein the diameter indicators are at 30°–40°, 120°–130°, 210°–230°, 300°–310° with reference to the protractor pattern.

10. The lens pattern blank according to claim 9, wherein the diameter indicators are at 35°, 125°, 215° and 305°.

11. The lens pattern blank according to claim 7, wherein the grid pattern and the protractor pattern are disposed on the same face.

* * * * *